(12) United States Patent
Zhang

(10) Patent No.: US 8,256,127 B1
(45) Date of Patent: Sep. 4, 2012

(54) DETECTING APPARATUS

(75) Inventor: Bing-Jun Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/223,238

(22) Filed: Aug. 31, 2011

(51) Int. Cl.
*G01B 3/30* (2006.01)
*G01B 3/46* (2006.01)
*G01B 5/14* (2006.01)

(52) U.S. Cl. .................. 33/520; 33/501.06

(58) Field of Classification Search ............ 33/520, 33/501.04–501.07, 556, 559, 544.5, 501.09, 33/501.1, 501.14, 501.17, 549, 552, 560
See application file for complete search history.

(56) References Cited

U.S. PATENT DOCUMENTS

| | | | | |
|---|---|---|---|---|
| 1,478,954 A | * | 12/1923 | Hardaker | 33/501.07 |
| 1,617,284 A | * | 2/1927 | Ames | 33/555.3 |
| 3,154,859 A | * | 11/1964 | Grabowski | 33/501.06 |
| 4,064,632 A | * | 12/1977 | Waldecker | 33/501.05 |
| 4,176,461 A | * | 12/1979 | Gebel et al. | 33/555.1 |
| 4,790,073 A | * | 12/1988 | DuPlanti | 33/555.1 |
| 4,926,700 A | * | 5/1990 | Peplinski | 73/862.23 |
| 5,353,516 A | * | 10/1994 | Dalton | 33/821 |
| 6,148,532 A | * | 11/2000 | Ellis | 33/533 |
| 6,408,532 B1 | * | 6/2002 | Keys et al. | 33/833 |
| 6,427,353 B1 | * | 8/2002 | Nelson et al. | 33/552 |
| 6,578,281 B2 | * | 6/2003 | Takahashi | 33/555.1 |
| 7,117,626 B1 | * | 10/2006 | Alzamora et al. | 33/506 |
| 7,963,045 B2 | * | 6/2011 | Zhang | 33/501.06 |

* cited by examiner

*Primary Examiner* — Yaritza Guadalupe-McCall
(74) *Attorney, Agent, or Firm* — Altis Law Group, Inc.

(57) ABSTRACT

A detecting apparatus is capable of detecting a vertical distance between a first axis and a second axis on a workpiece. The detecting apparatus includes a supporting plate, a first positioning member, a second positioning member, and a measuring member. The first positioning member and the second positioning member are arranged on the supporting plate along the first axis, and fix the horizontal position of the workpiece. The measuring member is arranged on the supporting plate along the second axis, and is capable to slide along the second axis. The measuring member is able to pass a bottom hole of the workpiece if the workpiece is qualified, and is unable to pass the bottom hole if the workpiece is not qualified.

11 Claims, 6 Drawing Sheets

DETECTING APPARATUS

BACKGROUND

1. Technical Field

The present disclosure relates to a detecting apparatus, and particularly, to a detecting apparatus for a workpiece.

2. Description of Related Art

Making holes in a workpiece requires techniques like punching, casting, injection molding, or machining, and the position of the hole needs to pass a standardized inspection to ensure the quality. Some techniques like the three dimensional measurement can be used to detect the distance between the two axes, however, those techniques are costly and inefficient, and can not fulfill the demand of mass production and detection.

Therefore, what is needed is a detecting apparatus that overcomes the above-mentioned problem.

BRIEF DESCRIPTION OF THE DRAWINGS

The components in the drawings are not necessarily drawn to scale, the emphasis instead being placed upon clearly illustrating the principles of a detection apparatus. Moreover, in the drawings, like reference numerals designate corresponding parts throughout the several views.

DETAILED DESCRIPTION

Figure 1:
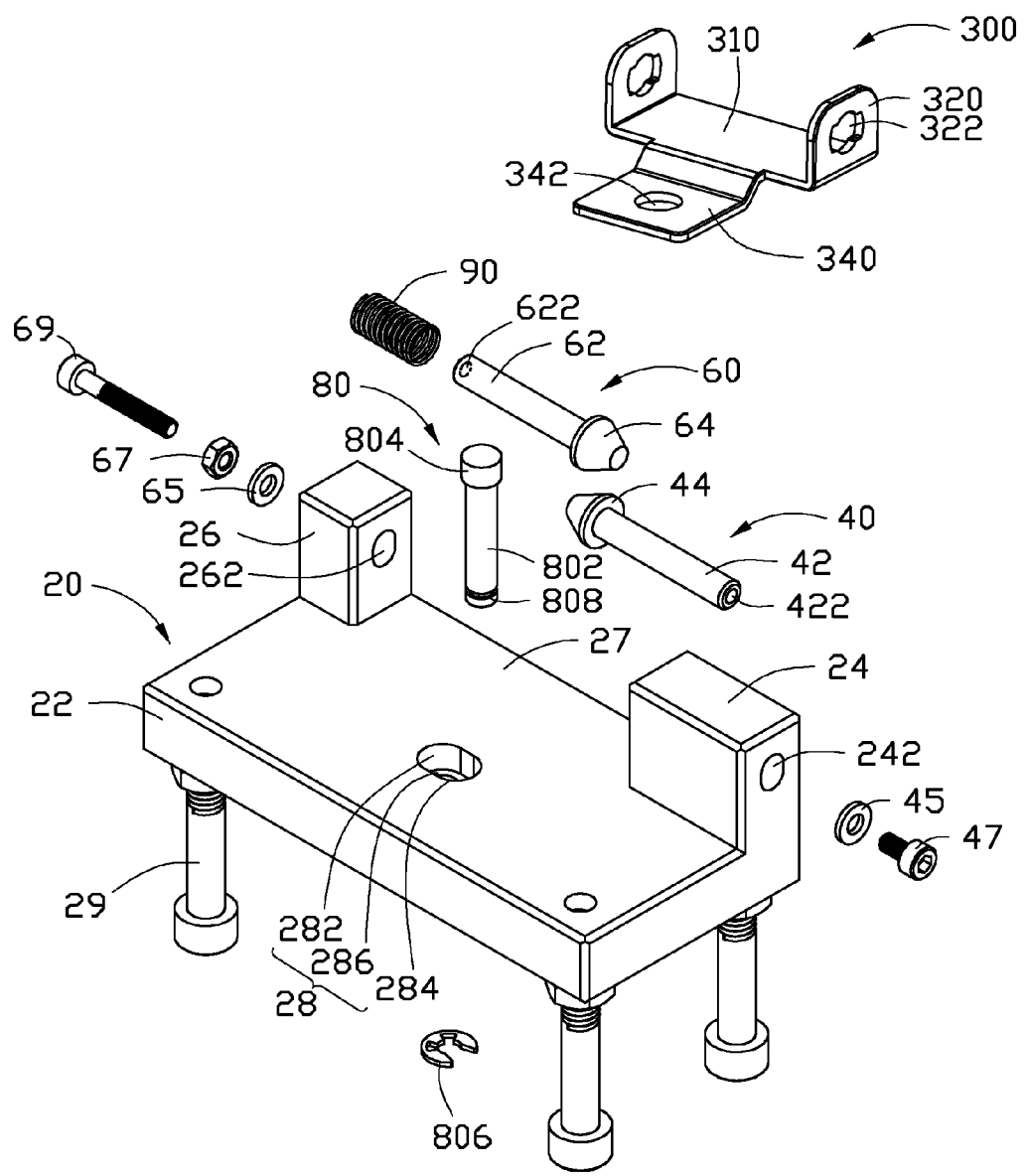
FIG. 1 is an isometric, exploded view of a detecting apparatus, together with a workpiece, in accordance with an exemplary embodiment.
Figure 2:
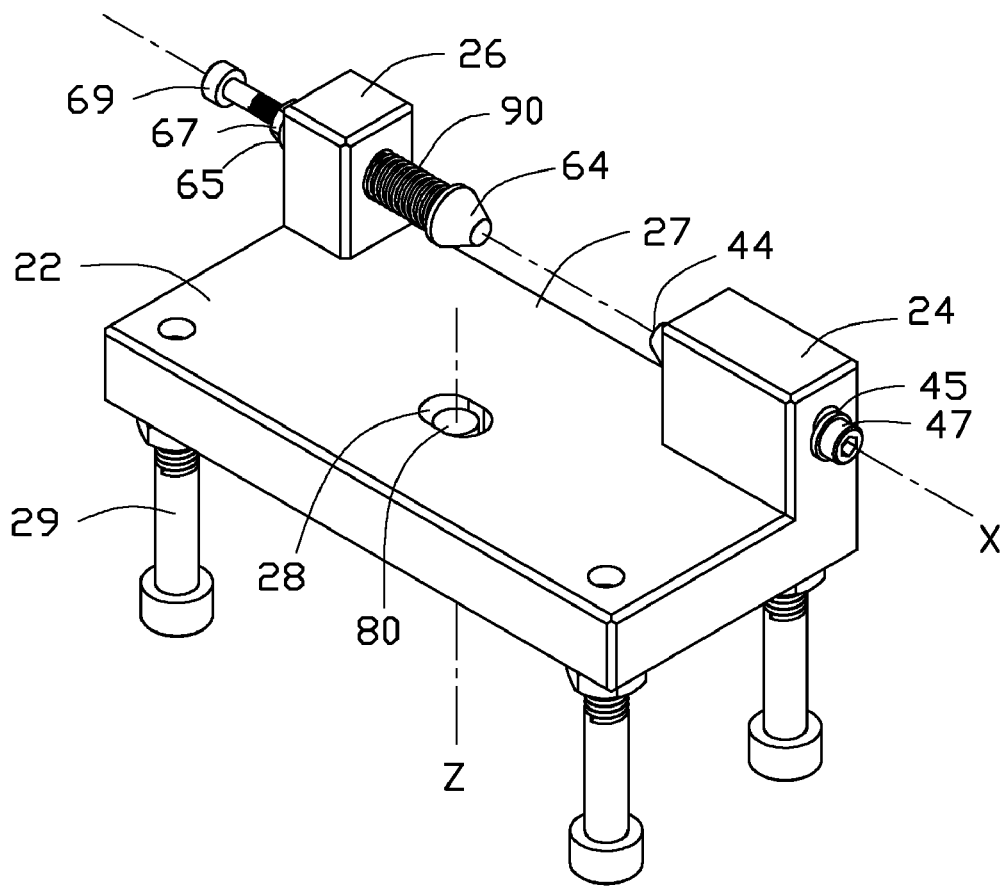
FIG. 2 is an assembled view of the detection apparatus of FIG. 1.

Referring to FIGS. 1, 2, 4, and 5, in the present embodiment, a workpiece 300 includes two side plates 320 and a bottom plate 340. The two opposing side plates 320 extend perpendicularly from two opposites sides of a main plate 310 of the workpiece 300. The bottom plate 340 extends noncoplanarly from the main plate, and is positioned in parallel with the main plate. Two side holes 322 are respectively defined on the two side plates 320 along a horizontal axis X, and a bottom hole 342 is defined on the bottom plate 340 along a vertical axis Z. The vertical distance between the axis X and the axis Z is W; the standard value, specified in the design specification, of W is L. The acceptable error of the vertical distance is a, and the acceptable value of the vertical distance W is L±a. The diameter of the bottom hole 342 is D.

In the present embodiment, the detecting apparatus 20 includes a supporting plate 22, four leveling members 29, a first supporting block 24, a second supporting block 26, a first positioning member 40, a second positioning member 60, and a measuring member 80. The four leveling members 29 engage with the four corner of the lower surface of the supporting plate 22. One end of each leveling member 29 is disposed on a tabletop or other solid surfaces (not shown), and the other end of the leveling member 29 is externally threaded thereon to screw to the supporting plate 22 to adjust the level of the supporting plate 22. A nut is screwed on each leveling member 29 to fasten the leveling member 29 to the supporting plate 22. The first supporting block 24 and the second supporting block 26 are arranged on two corners of the supporting plate 22, aligning with each other. A first positioning hole 242 and a second positioning hole 262 are defined on the first supporting block 24 and the second supporting block 26, respectively; the first positioning hole 242 and the second positioning hole 262 are obround, having a smaller diameter and a large diameter, and aligned to each other. An obround measuring hole 28 is defined on the supporting plate 22. The measuring hole 28 includes an obround large hole 282 positioned in the top region of the measuring hole 28, and an obround small hole 284 positioned in the bottom region of the measuring hole 28 having a smaller diameter and a larger diameter. A supporting surface 286 is formed between of the large hole 282 and the small hole 284. The vertical distance between the central line penetrating the centers of the first positioning hole 242 and the second positioning hole 262, and the central line penetrating the center of the measuring hole 28, is set to the standard value L.

The first positioning member 40 includes a first shaft 42, a first gasket 45, and a first mounting member 47. A conical first positioning part 44 extends from one end of the first shaft 42, and a first mounting hole 422 is defined on the other end of the first shaft 42. The diameter of the first shaft 42 is equal to the smaller diameter of the obround first positioning hole 242.

The second positioning member 60 includes a second shaft 62, a second gasket 65, a screw nut 67, a second mounting member 69, and a resilient member 90. A conical second positioning part 64 extends from one end of the second shaft 62, and a second mounting hole 622 is defined on the other end of the second shaft 62. In the present embodiment, the resilient member 90 is a compression spring. The diameter of the second shaft 62 is equal to the smaller diameter of the obround second positioning hole 262.

The measuring member 80 includes a cylindrical column 802, a concave measuring part 804 arranged on one end of the column 802, and a fixing trough 808 defined on the other end of the column 802; the fixing trough 808 can engage with a fixing member 806. The diameter of the column 802 is equal to the smaller diameter of the obround small hole 284 of the measuring hole 28. The diameter of the measuring part 804 is set to D-2a, which is larger than the larger diameter of the obround small hole 284, and smaller than the smaller diameter of the large hole 282 of the measuring hole 28.

Figure 3:
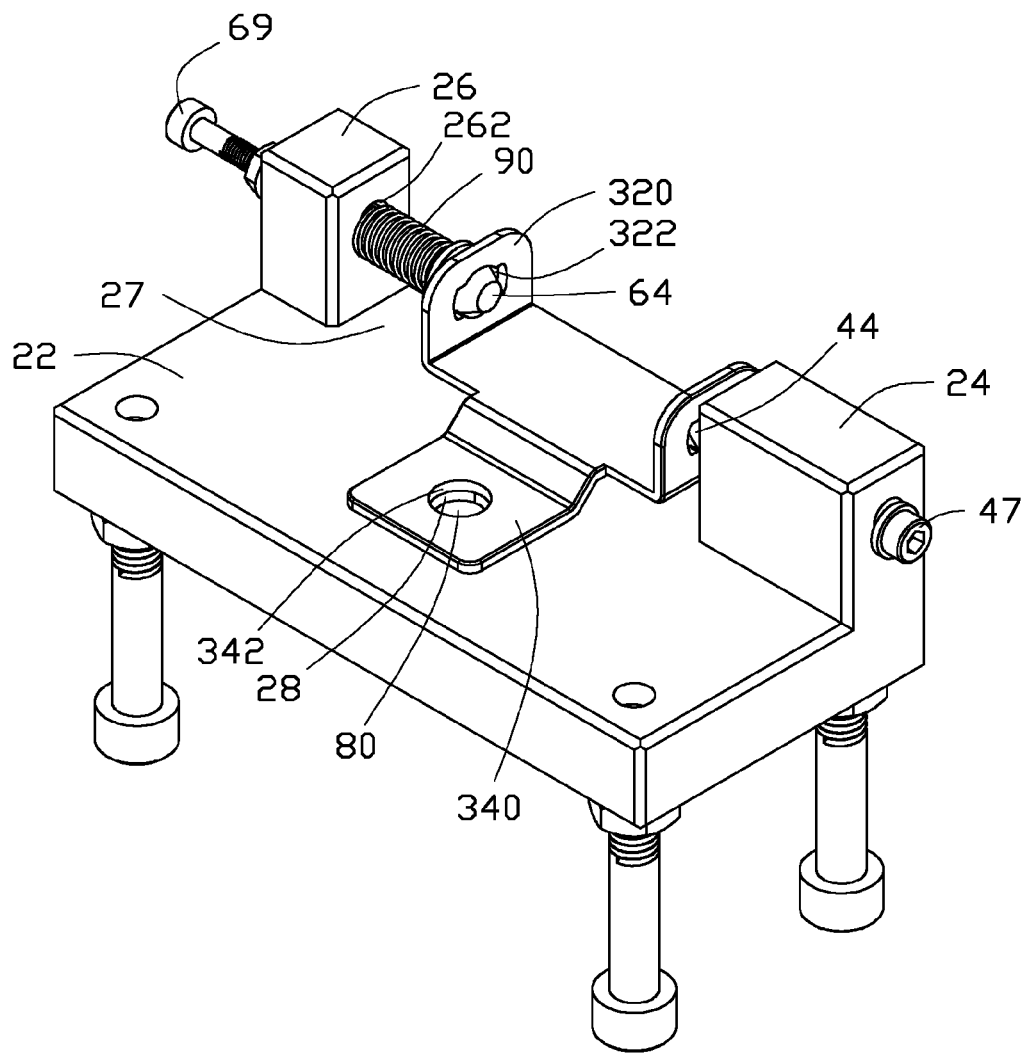
FIG. 3 is an assembled view of the detection apparatus and the workpiece of FIG. 1.
Figure 4:
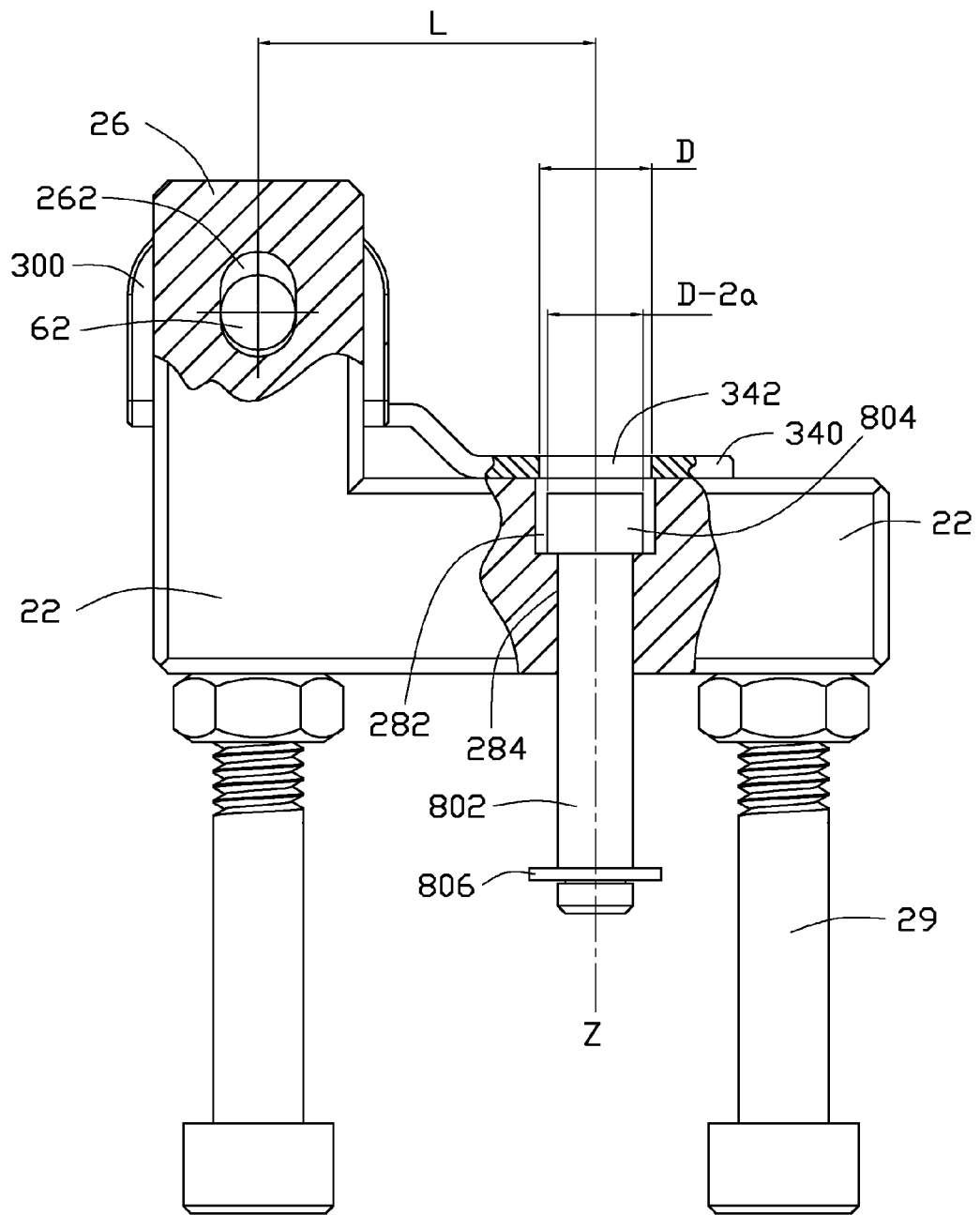
FIGS. 4-6 are cross-sectional views of the detection apparatus and the work piece showing different detecting states.

Referring to FIGS. 3-4, when assembling the detecting apparatus 20, the first shaft 42 of the first positioning member 40 is plugged into the first mounting hole 422 of the first supporting block 24, and the first positioning part 44 abuts against the surface of the first supporting block 24. The first mounting member 47 penetrates the first gasket 45 and mounts to the first mounting hole 422 of the first positioning member 40 to secure the first positioning member 40 to the first supporting block 24. The distance between the first positioning member 40 and the supporting plate 22 is adjustable because the first positioning member 40 can slide up and down in a direction parallel to the Z axis in the obround first positioning hole 242. The resilient member 90 is penetrated by the second shaft 62 of the second positioning member 60, and the second positioning member 60 is plugged into the second positioning hole 262; the resilient member 90 is restricted between the second positioning part 64 and the second supporting block 26. The second mounting member 69 penetrates through the screw nut 67 and the second gasket 65 and mounts to the second mounting hole 622 of the second positioning member 60 to secure the second positioning member 60 to the second supporting block 26. The distance between the second positioning member 60 and the supporting plate 22 is adjustable because the second positioning member 60 can slide up and down in the obround second positioning hole 262. The measuring member 80 penetrates the measuring hole 28 from the end with the fixing trough 808; the column 802 penetrates through the small hole 284 of the measuring hole 28, and the measuring part 804 of the measuring member 80 is blocked by the supporting surface 286. The fixing member 806 fixes to the fixing trough 808 of the column 802 to retain the measuring member 80 in the measuring hole 28. The measuring member 80 can slide up and down in the measuring hole 28 or slide left and right along the obround measuring hole 28. The vertical distance between the central line of the first positioning member 40 and the second positioning member 60, and the central line of the measuring member 80 is equal to the standard value L.

Figure 5:
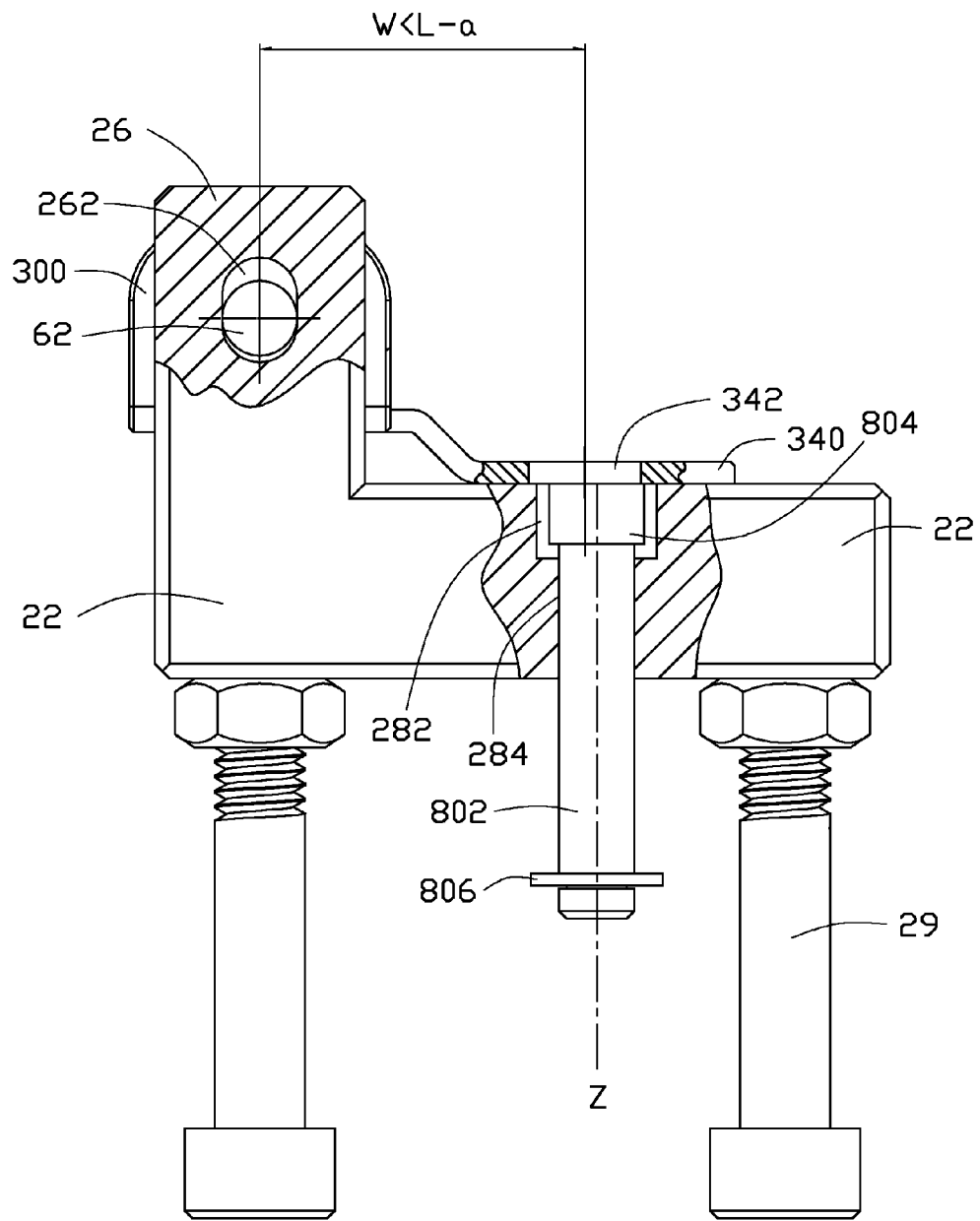
Figure 6:
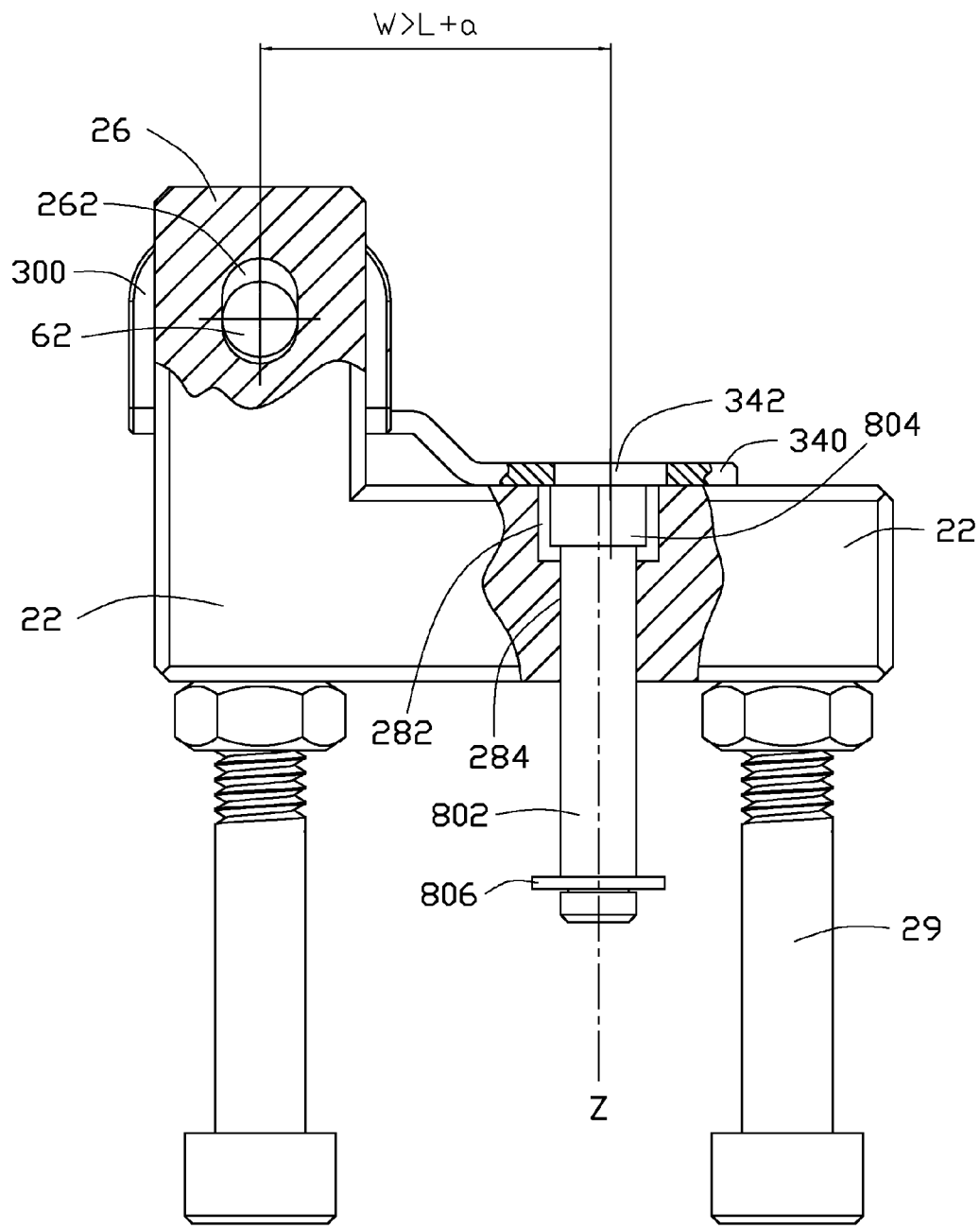

Referring to FIGS. 4-6, when measuring the workpiece 300, the second mounting member 69 is pulled outward along the X axis, and the resilient member 90 is compressed. The workpiece 300 is positioned between the first supporting block 24 and the second supporting block 26; one of the side hole 322 abuts to the first positioning part 44 of the first positioning member 40, and the other side hole 322 aligns to the second positioning part 64. The resilient member 90 is released to push the second positioning part 64 to engage the other side hole 322 when the second mounting member 69 is released. The workpiece 300 is restricted between the first positioning part 44 and the second positioning part 64, and the horizontal position is fixed. The vertical position of the workpiece 300 can be adjusted by adjusting the height of the first positioning member 40 and the second positioning member 60 to allow the bottom plate 340 of the workpiece 300 to abut to the supporting plate 22. When he measuring member 80 is pushed upward, the measuring part 804 can penetrate the bottom hole 342 of the workpiece 300 if L−a≦W≦L+a (FIG. 4), then the workpiece 300 is qualified. If the measuring part 804 cannot penetrate the bottom hole 342 of the workpiece 300 and if W<L−a (FIG. 5) or W>L+a (FIG. 6), then the workpiece 300 is not qualified.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A detecting apparatus for detecting a vertical distance between a first axis and a second axis on a workpiece, wherein two side holes are defined on the workpiece along the first axis, and a bottom hole is defined on the workpiece along the second axis, the detecting apparatus comprising:
   a supporting plate to support the workpiece;
   a first positioning member and a second positioning member arranged on the supporting plate along the first axis, wherein the first positioning member is capable of engaging one of the side holes, and the second positioning member is capable of sliding along the first axis relative to the supporting plate to engage the other side hole; and
   a measuring member arranged on the supporting plate along the second axis, wherein the measuring member is capable of sliding along the second axis relative to the supporting plate; if the measuring member is able to pass the bottom hole of the workpiece, the vertical distance between the first axis and the second axis is qualified, and if the measuring member is unable to pass the bottom hole of the workpiece, the vertical distance between the first axis and the second axis is not qualified.

2. The detecting apparatus as claimed in claim 1, wherein a first supporting block and a second supporting block extend from the supporting plate; a first positioning hole and a second positioning hole are defined on the first supporting block and the second supporting block, respectively; the first positioning member and the second positioning member are movably received in the first positioning block and the second positioning block, respectively.

3. The detecting apparatus as claimed in claim 2, wherein the first positioning hole and the second positioning hole are obround to allow the first positioning member and the second positioning member to move vertically in the first positioning hole and the second positioning hole, respectively.

4. The detecting apparatus as claimed in claim 2, wherein a first positioning part and a second positioning part are arranged on one end of the first positioning member and the second positioning member, respectively; the first positioning part and the second positioning part are conical and engage with the two side holes of the workpiece, respectively.

5. The detecting apparatus as claimed in claim 2, wherein a resilient member is set on the second positioning member, and the resilient member is restricted between the second positioning block and one end of the first positioning member; a second mounting hole is defined on other end of the second positioning member; a second mounting member mounts to the second mounting hole of the second positioning member to fix the second positioning member to the second positioning hole; the second positioning member slides away from the first positioning member when the second mounting member is pulled.

6. The detecting apparatus as claimed in claim 2, a first mounting hole is defined on other end of the first positioning member; a first mounting member mounts to the first mounting hole of the first positioning member to fix the first positioning member to the first positioning hole.

7. The detecting apparatus as claimed in claim 1, wherein a measuring hole is defined on the supporting plate; the measuring member is slidably received in the measuring hole.

8. The detecting apparatus as claimed in claim 7, wherein a small hole and a large hole is defined in the measuring hole; the small hole and the large hole is connected and a supporting surface is formed in the interface of the small hole and the large hole; the measuring member comprises a column and a measuring part arranged on one end of the column; the diameter of the column is equal to the small hole, and the diameter of the measuring part is larger than the small hole but smaller than the large hole.

9. The detecting apparatus as claimed in claim 8, wherein the measuring member comprises a fixing trough, and a fixing member engages with the fixing trough to retain the measuring member in the measuring hole when the measuring member is pushed upward.

10. The detecting apparatus as claimed in claim 1, wherein the measuring hole is obround to allow the measuring member to move in a direction parallel to the first axis in the measuring hole.

11. The detecting apparatus as claimed in claim 1, wherein the detecting apparatus comprises a plurality of leveling members connected to the supporting plate to adjust the level of the supporting plate.

* * * * *